(12) United States Patent
Roentgen et al.

(10) Patent No.: US 9,121,759 B2
(45) Date of Patent: Sep. 1, 2015

(54) ARRANGEMENTS FOR DETECTING LIGHT OF DIFFERENT WAVELENGTH AT DIFFERENT ANGLES

(71) Applicant: Heptagon Micro Optics Pte. Ltd., Singapore (SG)

(72) Inventors: Peter Roentgen, Thalwil (CH); Markus Rossi, Jona (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 201 days.

(21) Appl. No.: 14/021,065

(22) Filed: Sep. 9, 2013

(65) Prior Publication Data

US 2014/0027623 A1  Jan. 30, 2014

(51) Int. Cl.
*G01J 5/02* (2006.01)
*H01L 27/00* (2006.01)
*G01J 1/04* (2006.01)
*G01J 1/06* (2006.01)
*G01J 3/36* (2006.01)
*G01J 3/02* (2006.01)
*G01J 1/42* (2006.01)

(52) U.S. Cl.
CPC .............. *G01J 1/0488* (2013.01); *G01J 1/0407* (2013.01); *G01J 1/0437* (2013.01); *G01J 1/06* (2013.01); *G01J 1/4204* (2013.01); *G01J 1/4228* (2013.01); *G01J 3/0229* (2013.01); *G01J 3/36* (2013.01); *G01J 2001/4247* (2013.01)

(58) Field of Classification Search
CPC ... G01J 1/0407; G01J 3/0205; H01J 27/1462; H01J 27/14625; H01J 27/14685
USPC ............... 250/216, 226, 208.1; 257/432, 435; 359/586, 587
See application file for complete search history.

(56) References Cited

U.S. PATENT DOCUMENTS 7,138,619 B1 * 11/2006 Ferrante et al. ................ 250/216
2014/0118602 A1 * 5/2014 Shinohara et al. ............ 348/340

* cited by examiner

*Primary Examiner* — Kevin Pyo
(74) *Attorney, Agent, or Firm* — Fish & Richardson P.C.

(57) ABSTRACT

Disclosed is an arrangement for detecting first light (L1) and second light (L2), with the first light (L1) and second light (L2) having no wavelength in common. The arrangement includes a first effective detector area (D1) and a second effective detector area (D2). The first effective detector area (D1) is exposed to the first light (L1) and/or second light (L2) different from the first light (L1) and/or second light (L2) to which the second effective detector area (D2) is exposed when the arrangement is exposed to spatially uniformly distributed first light (L1) and second light (L2). The difference between the first light (L1) and/or second light (L2) to which said first detector area (D1) and second detector area (D2) are exposed to can be a difference in intensity and/or difference in an angle of incidence relative to the arrangement.

22 Claims, 6 Drawing Sheets

Figure 1:
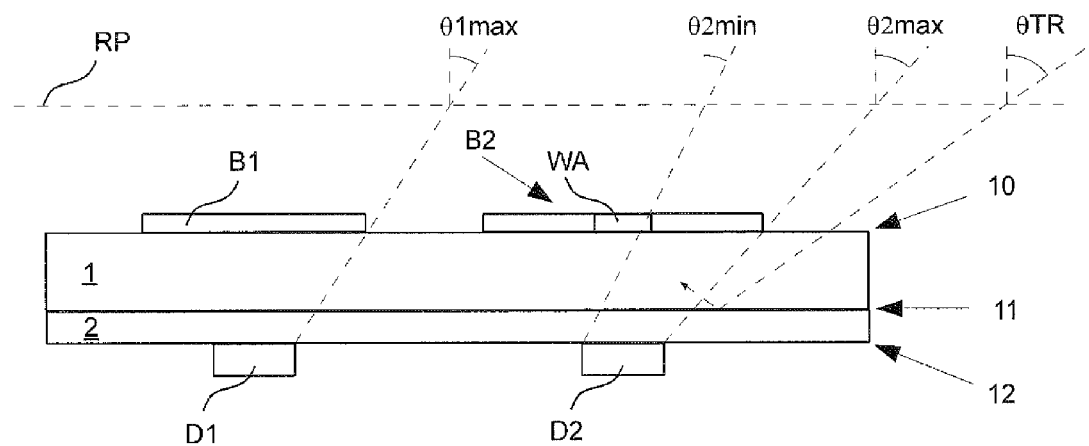

1
ARRANGEMENTS FOR DETECTING LIGHT OF DIFFERENT WAVELENGTH AT DIFFERENT ANGLES

The invention relates to detection of light, in particular to arrangements for detecting first and second light with first and second light having no wavelength in common. It relates to an arrangement as described in the preamble of the corresponding independent claims. Furthermore, the invention relates to said arrangement comprising a light source for second light.

Arrangements for detecting first and second light are widely used in electronic devices, for example for detecting multiple light sources. Multiple light sources which are detected are for example ambient light as first light and infrared light (IR-light) as second light. While detection of ambient light is for example used for adaptation of brightness of illuminated parts of said electronic device (such as displays, lamps and/or LEDs), detection of IR-light is for example used for distance measuring between said electronic device and another object (such as an ear of a user of said electronic devise, a desktop and/or a clothing pocket wall). Depending of the application, first and/or second light are preferably measured at specific angles of incidence (AOI) or ranges of AOI relative to a surface of the arrangement. Distance measurements for example are in many cases preferably conducted at low AOIs, whereas ambient light intensity is in many cases preferably measured at AOIs between a few degrees and 90 degrees. Typically, said arrangements are used in electronic devices such as mobile phones, telephone handsets, computer tablets, digital cameras or portable music players.

Current state of the art arrangements have in some cases the disadvantage that they are not capable of separating first and second light to a significant level unless using expensive or complex dispersive elements. In other cases, state of the art arrangements feature a complex setup, which is complicated and/or expensive to produce. State of the art arrangements are in some cases large in size and therefore not suitable for miniaturized applications and/or feature a large number of different highly specific components. Other arrangements may not easily be capable of distinguishing first and second light with specific angles of incidence (AOI).

It is therefore an object of the invention to create an arrangement of the type mentioned initially, which overcomes at least partially at least one of the disadvantages mentioned above.

Such an object is at least partially achievable by an arrangement according to the patent claims.

A first aspect of the invention concerns an arrangement for detecting first light and second light, with first light comprising one or more wavelengths of a first wavelength range only, and second light comprising one or more wavelengths of a second wavelength range only. Said first and second wavelength ranges are free of overlap, i.e. both ranges featuring different wavelengths only.

Said arrangement comprises a first effective detector area and a second effective detector area, a first layer, a second layer, and at least a first and a second blocking area. Said first and second effective detector areas may belong to different detectors or may, alternatively, be different sections of one and the same detector.

Optical properties of said first and second layer are different from each other in at least its refractive index. Said first layer is for example a substrate of glass. Said second layer optionally comprises a fluid or is a fluid, for example a gas and especially air. However, said second layer may be a solid, e.g., said second layer may comprise or be made of a glue and/or comprise or be made of lithium fluoride (LiF). Said second layer is featuring a thickness of for example between 0.1 and 10 micrometers, but can also be as small as 5 or more nanometers or as large as up to 1 or 10 micrometers. This second layer may even consist of multiple layers.

Said first layer is forming a joint interface with said second layer, said joint interface being referred to as reflection interface. Said first layer is featuring a blocking face being different from said reflection interface, and said blocking face is facing said first and second blocking areas. Said blocking face of the first layer is for example situated opposite to said reflection interface.

Said first and second blocking areas are usually free of spatial overlap i.e. said first and second blocking areas are situated in locations different from each other.

Said second layer is featuring a detection face being different from said reflection interface, and said detection face is facing said first and second effective detector areas.

Said effective detector areas are usually free of spatial overlap. Said effective detector areas are for example spatially separated areas of one and the same detector, for example spatially separated areas of a single detector array. In a more general example, said effective detector areas can also be different areas of one or more detectors. For instance, two distinct detectors are provided, and each distinct detector features a different one of said two effective detector areas.

Said effective detector areas are for example featuring a same type of detector. Or said effective detector areas are for example featuring different types of detectors. Different types of detectors differ for example in structure of the detector, detector material composition, sensitivity, mode of operation, operating principle and/or other features of a detector.

Said effective detector areas may for example be comprised in a single photo detector array, i.e. said effective detector areas feature the same type of detector which is a photo detector array, and each effective detector area is constituted by a different section of that photo detector array.

Said first blocking area is substantially made of a first material, said first material being substantially attenuative or substantially reflective for light of said first wavelength range and for light of said second wavelength range. Said first material is for example a composite material and/or a structured material. However, it may be a homogeneous material such as a metal.

Said second layer is featuring at said reflection interface a refractive index being smaller than a refractive index of said first layer at said reflection interface for any wavelength $\lambda 1$ and for any wavelength $\lambda 2$. Therefore, total reflection can occur at said reflection interface depending on the angle of incidence (AOI) and (usually to a small amount only) on the wavelength of light propagating from said first layer to said reflection interface. $\lambda 1$ designates a wavelength comprised in said first wavelength range, and $\lambda 2$ designates a wavelength comprised in said second wavelength range.

$\theta TR$ designates the minimum angle of incidence relative to a reference plane for which total reflection for a respective wavelength occurs at said reflection interface. An angle of incidence of light relative to a plane is defined as an angle between said light and a line perpendicular to said reference plane which crosses said plane at the same point as said light. Thus, $\theta TR$ designates an AOI at which and above which light propagating from said first layer to said second layer is totally reflected at said reflection interface back towards said first layer. Light with an AOI below $\theta TR$ can propagate into said second layer.

Said reference plane is for example a plane parallel to said reflection interface. In another example, said reference plane is parallel to said detection face. In a further example, said reference plane is parallel to said blocking face. In another example, said reference plane is parallel to said first and second effective detector areas (i.e. to the surfaces of said effective detector areas facing said detection face). In a further example, said reference plane is parallel to an outer surface at an end of said arrangement which is situated opposite to said first and second effective detector areas.

Still in said first aspect of the invention, said first blocking area is structured for substantially inhibiting a propagation of light of any wavelength $\lambda 1$ and of any wavelength $\lambda 2$ from the blocking face through said first layer and said second layer to said first effective detector area for any angle of incidence $\theta$ relative to said reference plane for which applies $0° \leq \theta \leq \theta 1max$. $\theta 1max$ designates an angle of incidence relative to said reference plane for which applies $\theta 1max < \theta TR$ for any wavelength $\lambda 1$ (and for any wavelength $\lambda 2$). Writing that an element (in this case said first blocking area) is structured can, in particular, mean that it features a specific lateral shape and, more particularly, a specific lateral extension. Said lateral shape or extension is for example referring to a plane parallel to said blocking face and/or to said reference plane. Thus, it can be achieved that said first blocking area in combination with said reflective interface allows a propagation of light of any wavelength $\lambda 1$ from the blocking face through said first layer and said second layer to said first effective detector area for any angle of incidence $\theta$ relative to said reference plane for which applies $\theta 1max < \theta < \theta TR$.

Said second blocking area is structured for substantially inhibiting a propagation of light of any wavelength $\lambda 1$ from the blocking face through said first layer and said second layer to said second effective detector area for all angles of incidence $\theta$ relative to said reference plane for which applies $0° \leq \theta \leq \theta 2max$. Said $\theta 2max$ is designating an angle of incidence relative to said reference plane for which applies $\theta 2max \geq \theta TR$ for the respective wavelength $\lambda 1$. Thus, it can be achieved that said second blocking area in combination with said reflective interface inhibits a propagation of light of any wavelength $\lambda 1$ from the blocking face through said first layer and said second layer to said second effective detector area.

Said second blocking area comprises a window area made of a second material. Said second material is substantially attenuative or substantially reflective for said first light, and said second material is substantially transmissive for said second light. Said second material is for example a composite material and/or a specifically structured material. Optionally, said second blocking area comprises in addition to said second material a third material in an area different from said window area. Said third material is for example substantially attenuative or substantially reflective for both wavelength ranges (i.e. for light of said first wavelength range and for light of said second wavelength range). For example, said third material is the same material as said first material.

Said window area is structured for substantially allowing a propagation of light of any wavelength $\lambda 2$ from the blocking face through said first layer and said second layer to said second effective detector area for any angle of incidence $\theta$ relative to said reference plane for which applies $0° \leq \theta < \theta 2min$ for the respective wavelength $\lambda 2$. Said AOI $\theta 2min$ is designating an angle of incidence relative to said reference plane for which applies $\theta 2min > 0°$.

Said second blocking area is furthermore structured for substantially inhibiting a propagation of light of any wavelength $\lambda 2$ from the blocking face through said first layer and towards and through said second layer to said second effective detector area for all angles of incidence $\theta$ relative to said reference plane for which applies $\theta 2min \leq \theta \leq \theta 2max$. Said $\theta 2max$ is designating an angle of incidence relative to said reference plane with $\theta 2max \geq \theta TR$ for the respective wavelength $\lambda 2$. Said $\theta 2max$ is designating an angle of incidence relative to said reference plane with $\theta 2min \leq \theta 2max$ for the respective wavelength $\lambda 2$.

Thus, the arrangement can make possible to simultaneously detect said first light and said second light, with said first light being detected by said first effective detector area for any angle of incidence $\theta$ relative to said reference plane for which applies $\theta 1max < \theta < \theta TR$ and with said second light being detected by said second effective detector area for any angle of incidence $\theta$ relative to said reference plane for which applies $0° \leq \theta < \theta 2min$. Therefore, said arrangement can make possible to measure simultaneously said first light with a specified AOI and said second light with another specified AOI which is smaller than said AOI of first light.

This can allow for example to measure simultaneously ambient visible light as first light at an AOI in a range of 10° to 25° (and therefore expected to be coming from the general environment of said arrangement and not from a frontally approached object) and IR light (infrared light) with an AOI in a range of 0° to 5° (and therefore expected to be coming from a frontally approached object and not from the general environment of said arrangement). This allows to measure ambient light brightness and distance to an object positioned in front of said arrangement at the same time using said arrangement.

Said arrangement can be compact, simple in structure, straight forward in use and cheap to produce. Said arrangement is capable of distinguishing light with different AOI. Said arrangement is furthermore capable of distinguishing between light of a first wavelength range and light of a second wavelength range by at least partially suppressing light of the respective other range in the respective other effective detector area.

As an option, said first and second blocking areas are structured such that $\theta 2min < \theta 1max$ and therefore said first light detected by said first effective detector area is measured in a range of AOI which has no AOI in common with a range of AOI in which said second light is detected by said second effective detector area.

As an optional feature, said arrangement according to the first aspect comprises a layer referred to as filter layer. Said filter layer is located either between said blocking areas and said effective detector areas, or said blocking areas are located between said filter layer and said effective detector areas. As an option, said filter layer is spatially arranged and configured such that any light path passing through said arrangement and passing through said first and second layer towards said first or second effective detector areas is passing said filter layer.

Depending on the material, structure and operating principle of the filter layer, this filter layer can function for example as a low pass filter, as a high pass filter or as a bandpass filter. A typical example of a low pass filter would be, e.g., a thin metal layer such as a gold layer: thin layers of gold change their behavior from reflective to transmissive at the plasma frequency. Examples of high-pass filters are semiconductor layers: semiconductors are almost transparent below their band gap energy but absorptive above. Examples for band-pass filters are so-called dielectric multilayers which consist of a (designable) stack of layers of transparent materials with different refractive indices.

It can in particular be provided that said filter layer is substantially transmissive for light of any wavelength $\lambda 1$, and it in addition constitutes substantially a band-pass filter in a wavelength range different from said first wavelength range.

Said band-pass filter features a central wavelength. Said central wavelength is designating a characteristic wavelength of said band-pass filter. Said central wavelength can in particular be an arithmetic average of two wavelengths at which transmittance is 50% of a maximal transmission of said band-pass filter. If more than two such wavelengths exist in the wavelength range where said filter layer constitutes said band-pass filter, then the wavelength with the lowest wavelength value and the wavelength with the highest wavelength value are averaged.

Said central wavelength can in particular be depending on an angle of incidence θ relative to said reference plane. E.g., said central wavelength is within said second wavelength range in case of θ=0°, and said central wavelength is outside said second wavelength range in case of θ>θf. θf is a threshold angle of incidence with 0°<θf<90°, with θf≤θ1max and θf≤θ2max. In other words, said filter layer has a central wavelength depending on said AOI θ for light transmitted through said filter layer, provided said transmitted light lies in a wavelength range for which said filter layer acts as a band-pass filter. Therefore, light of any wavelength λ2 incident on said filter layer is transmitted with an intensity depending on its AOI since the central wavelength depends on the AOI. This effect can be used to control intensity of said second light incident on said effective detector areas in dependence of the AOI of said second light.

Said filter layer can advantageous be because in combination with said reflection interface and said first and second blocking areas, said arrangement may allow to distinguish said first light and said second light completely. In other words, said first effective detector area is blocked for second light with any AOI relative to said reference plane and said second effective detector area is blocked for first light with any AOI relative to said reference plane.

It is possible that said arrangement features more than one filter layer, e.g., on top of each other. Said filter layers may in particular have different optical properties. This can for example enhance distinction between first and second light. But each additional filter layer adds to production cost. Each filter layer may be a multilayer.

Said filter layer can also for example be comprised by said first layer. Said filter layer for example forms a part of said first layer.

As another optional feature, said arrangement according to the first aspect is characterized in said filter layer being said first layer. In other words, said first layer may be identical with said filter layer.

Said filter layer either being said first layer or being comprised by said first layer can be advantageous since the corresponding arrangement is compact and production cost can be reduced.

Said filter layer can optionally also be situated between said effective detector areas and said second layer. Said filter layer is for example positioned adjacent to said detector face of said second layer. Said filter layer is for example positioned adjacent to said detector face of said second layer and adjacent to said first and second effective detector areas.

As another option, said filter layer can also be situated between said blocking areas and said first layer. Said filter layer is for example positioned adjacent to said blocking face of said first layer. Said filter layer is for example positioned adjacent to said blocking face of said first layer and adjacent to said first and second blocking areas.

In another example, said first and second blocking areas are located between said filter layer and said first layer. Said filter layer is for example positioned adjacent to said first and second blocking areas on a side of said first and second blocking areas facing said first layer.

An arrangement according said first aspect may optionally be characterized in said filter layer being a multilayer and/or comprising a multilayer optical component. In particular, said filter layer is such a multilayer optical component i.e. said filter layer consists of a multitude of layers, e.g., layers of different material compositions alternatingly stacked upon each other. Said multilayer optical component for example can comprise layers with different refractive indices and therefore can operate as a so-called dielectric filter. Said multilayer optical component for example comprises layers comprising (in particular substantially made of) silicon dioxide (SiO2) and/or layers comprising (in particular substantially made of) titanium dioxide (TiO2).

Multilayer optical components comprising layers of SiO2 and TiO2 are well known and feature low in production costs compared to other multilayer components with comparable optical properties. Furthermore, such a multilayer optical component can feature the above-described optical properties combining transmission of said first light with a band-pass filter for said second light if produced in a suitable but simple layer structure with varying layer thicknesses.

As another optional feature to said first aspect, said second blocking area consists of said window area, and θ2min=θ2max applies. Said second blocking area can in this case for example be entirely made of said second material. In such an example, all parts of said second blocking area are substantially attenuative or substantially reflective for said first light and substantially transmissive for said second light. Such a second blocking area is simple to produce (including a structuring).

For example, said second material comprises an organic material. In particular, said second material comprises a photoresist or is a photoresist. Blocking areas comprising an organic material (and in particular photoresist) or consisting of organic material (and in particular photoresist) are easily produced and structured, for example if said organic material is applied in liquid form.

As another example, said second material comprises or is a semiconductor material. In particular, said second material comprises an amorphous semiconductor material and more particularly amorphous silicon, or the second material is said amorphous semiconductor material. Said second material may comprise or be Germanium. Blocking areas comprising a semiconductor material (and in particular amorphous silicon) or consisting of a semiconductor material (and in particular amorphous silicon) can feature a high level of transmission of second light and a low level of transmission of first light. As an alternative, said second material can also be any material known and used for optical filters.

In an arrangement according to said first aspect can optionally comprise a light source. Said detection face of said second layer is in this case usually facing said light source. Said light source can in particular be a light source for emitting said second light along an optical path from said light source towards and through said detection face, towards and through said second layer, towards and through said first layer and towards and through said blocking face.

Said light source is for example a light-emitting diode (inorganic and/or organic). Said light source can comprise multiple diodes. Second light emitted from said light source can pass and exit said arrangement. If said second light is reflected by an object outside said arrangement, said second light can enter said arrangement again and pass the first and second layers again (in a direction substantially opposite to a direction while passing and exiting said arrangement) and possibly be detected by said second effective detector area.

Said light source can optionally be combined with at least one further element, for example with an aperture, lens, mask, reflector, mirror and/or light conductor to direct, block, reflect, bundle and/or focus said second light which is emitted from said light source. This can be used to increase an intensity of light illuminating a region outside said arrangement in which an object may be positioned which may reflect said second light back towards said arrangement. Furthermore, this can reduce (or eliminate) an intensity of said second light emitted by said light source in an undesired direction, for example inside said arrangement. This can reduce stray light and therefore reduce background noise for said effective detector areas.

Said light source can be advantageous since said arrangement therefore can emit second light and detect a reflected portion of said second light with said second effective detector area under certain conditions. These conditions depend on the specific structure, components and material of said arrangement. Reflected portions of said emitted second light can be detected for AOI θ of said reflected light relative to said reference plane which applies 0°≤θ<θ2min for the respective wavelength λ2. Therefore, reflected second light is detected for small AOI, which is for example well suited for distance measurements or proximity detection. Distance measurements are useful for many applications, for example in moveable electronic devices to estimate relative positions of expected and/or unexpected elements as surfaces, pockets, ears and a face or a part of a face.

It can be an advantage of said arrangement comprising a light source in combination with a filter layer that the filter layer (acting as a band-pass filter for said second light) is passed a first time while exiting said arrangement and is passed a second time after having been reflected outside said arrangement while entering said arrangement again before being detected in said second effective detector area. Therefore, optical properties and/or other physical conditions (such as temperature, pressure, aging effects etc) of said filter layer influence and/or define said second light both while exiting and entering said arrangement again in essentially the same way.

If for example due to temperature changes, said central wavelength of said band-pass filter for second light is shifted to lower wavelength values, this will effect said emitted second light (whose central wavelength is therefore shifted to lower wavelength) in the same way as said reflected and detected second light (whose shifted central wavelength corresponds to said shifted central wavelength of said filter layer and passes therefore said filter layer). Therefore, such measurements are stable even in case of varying environmental and/or internal conditions. In other words, effects on second light caused by said filter layer while exiting said arrangement can be compensated at least partially while said reflected second light is entering said arrangement again before being detected by said second effective detector area.

Angle θ1max can for example be smaller or equal to 75°, in particular θ1max can be in a range from 10° to 65°, and more particularly θ1max can be in a range from 20° to 55°.

An arrangement with a value for θ1max being roughly in the range of 10° to 45° advantageously detects first light substantially inclined to said reference plane and is for example suitable for measuring first light emitted from a surrounding of said arrangement and/or to be used as a ambient light sensor.

Angle θ2min can for example be smaller or equal to 25°, in particular θ2min can be in a range from 2° to 15° and more particularly θ2min can be in a range from 5° to 10°.

An arrangement with a low value for θ2min typically detects second light incident substantially perpendicularly to said reference plane and can for example be suitable for measuring distances and/or for being used as a proximity sensor.

As an optional feature, said first effective detector area and/or said second effective detector area comprise a multitude of individual subsensors comprised within one contiguous multisensor. In particular, said first effective detector area and said second effective detector area each comprise a set or selection of pixels comprised in a single pixel-array.

Contiguous multisensors can be produced at low cost and feature a sturdy and compact design. A contiguous multisensor is a contiguous sensor featuring a multitude of individual sensors. Said individual sensors can be of one type or of different type. As an example, one contiguous multisensor comprises said first and said second effective detector area. In another example, a first contiguous multisensor comprises said first effective detector area and a second contiguous multisensor comprises said second effective detector area. Alternatively, one or both of said first and second effective detector areas comprise more than one contiguous multisensor.

In one possible embodiment of said first aspect, said first blocking area and/or said second blocking area has an elliptic shape. In particular, said first blocking area and/or said second blocking area feature a circular shape.

Elliptic shapes and in particular circular shapes have the advantage to be producible relatively easily. Furthermore, blocking areas featuring elliptic shapes (and in particular circular shapes) which are combined with corresponding effective detector areas of same or similar shape allow to block light with a specified AOI originating from all directions more or less equally. In other words, such arrangements have a sensitivity (or blocking capability) for light incident with a specified AOI which is substantially independent of a direction of incidence of said light (at said specified AOI). Light with a specified AOI relative to a surface may propagate along various different directions.

Alternatively, said blocking areas may feature a rectangular shape, a bean or kidney shape, a polygonal shape or another shape. Said first and said second blocking area may feature the same or similar shape, or they can feature different shapes.

As an example, said first wavelength range is comprised within a wavelength range from 380 nm to 750 nm which is visible to the human eye, and said second wavelength range is comprised within a wavelength range from 750 nm to 10 µm.

Such a choice of wavelength ranges is for example suitable for measuring ambient light as first light while simultaneously measuring a distance using said second light.

Another example is a wavelength range of 1 µm-10 µm (IR light) for first light and a wavelength range from 380 nm to 750 nm (visible to the human eye) for second light. Such an arrangement could for example be used for measuring a temperature of an object with first light (using IR light with for example a wavelength of 10 µm emitted by said object) while simultaneously measuring a distance to said object with second light (using visible light, for example with a laser with for example a wavelength of 380 nm). In such a case, gold (or other metals) could be a suitable second material for said window area, since very thin gold layers (or very thin layers of other metals) can be transmissive for light visible to the human eye but reflective for IR light.

A second aspect of the invention concerns an arrangement for detecting first light and second light, with first light comprising one or more wavelengths of a first wavelength range only, and second light comprising one or more wavelengths of a second wavelength range only. Said first and second wavelength ranges are free of overlap, i.e. the ranges feature different wavelengths.

All optional features and variants described for the first aspect of the invention are also valid for the second aspect of the invention (and vice versa). If nothing else is stated, all examples, definitions, advantages, alternatives and detailed descriptions regarding the first aspect of the invention do also apply for the second aspect of the invention (and vice versa). Elements, parts, concepts, teachings, principles, and/or functionalities which are designated identically in the first and the second aspect of the invention do feature the same properties, characteristics, advantages, options and alternatives if nothing else is stated.

Said arrangement comprises a first effective detector area and a second effective detector area, a base layer and at least a first and a second blocking area.

Said base layer is featuring a lower face facing said first and second effective detector areas. Furthermore, said base layer is featuring an upper face being different from said lower face, said upper face facing said first and second blocking areas.

Said arrangement also comprises a layer referred to as filter layer. Said filter layer is substantially transmissive for light of any wavelength $\lambda 1$, $\lambda 1$ designating a wavelength comprised in said first wavelength range. Furthermore, said filter layer is constituting substantially a low pass filter, a high pass filter and/or a band-pass filter for light of any wavelength $\lambda 2$, $\lambda 2$ designating a wavelength comprised in said second wavelength range.

As an option, said filter layer provides the function of a band-pass filter having a central wavelength, said central wavelength depending on an angle of incidence $\theta$ relative to a reference plane. Said central wavelength lies within said second wavelength range in case of an AOI $\theta=0°$, and said central wavelength lies outside said second wavelength range in case of an AOI $\theta>\theta f$. $\theta f$ designates an angle of incidence relative to said reference plane with $0<\theta f<90°$, and it designates a threshold angle of incidence.

Said reference plane is for example a plane parallel to said lower face. In another example, said reference plane is parallel to said upper face. In a further example, said reference plane is parallel to said first and second effective detector areas (i.e. to the surfaces of said effective detector areas facing said lower face). In a further example, said reference plane is aligned parallel to an outer surface at an end of said arrangement which is situated opposite to said first and second effective detector areas.

Said first blocking area is substantially made of a first material. Said first material is substantially attenuative or substantially reflective for light of said first wavelength range and for light of said second wavelength range.

Furthermore, said first blocking area is structured for substantially inhibiting a propagation of light of any wavelength $\lambda 1$ and of light of any wavelength $\lambda 2$ from the upper face through said base layer to said first effective detector area for any angle of incidence $\theta$ relative to said reference plane for which applies $0°\leq\theta\leq\theta 1max$, wherein $\theta 1max$ designates an angle of incidence relative to said reference plane for which applies $\theta 1max<90$ for any wavelength $\lambda 1$ and $\theta 1max\geq\theta f$ for any wavelength $\lambda 2$, $\lambda 2$ designating a wavelength comprised in said second wavelength range.

Said second blocking area is furthermore structured for substantially inhibiting a propagation of light of any wavelength $\lambda 1$ from the upper face through said base layer to said second effective detector area for all angles of incidence $\theta$ relative to said reference plane for which applies $0°\leq\theta\leq\theta 2max$. $\theta 2max$ designates an angle of incidence relative to said reference plane.

Said second blocking area comprises a window area being made of a second material. Said second material is substantially attenuative or substantially reflective for said first light and is substantially transmissive for said second light.

Said window area is structured for substantially allowing a propagation of light of any wavelength $\lambda 2$ from the blocking face through said base layer to said second effective detector area for any angle of incidence $\theta$ relative to said reference plane for which applies $0°\leq\theta\leq\theta 2min$ for the respective wavelength $\lambda 2$. $\theta 2min$ designates an angle of incidence relative to said reference plane for which applies $\theta 2min>0°$.

Said second blocking area is furthermore structured for substantially inhibiting a propagation of light of any wavelength $\lambda 2$ from the blocking face through said base layer to said second effective detector area for all angles of incidence $\theta$ relative to said reference plane for which applies $\theta 2min\leq\theta\leq\theta 2max$. $\theta 2max$ designates an angle of incidence relative to said reference plane with $\theta 2max\geq\theta f$ for the respective wavelength $\lambda 2$, and with $\theta 2min\leq\theta 2max$ for the respective wavelength $\lambda 2$.

As an option, said first and second blocking areas are structured such that $\theta 2min<\theta 1max$.

As an optional feature, said filter layer is identical with said base layer. In this case, the base layer consists of said filter layer.

As another optional feature, said filter layer is comprised in said base layer. In this case, said base layer constitutes said filter layer and possibly comprises more parts or layers in addition.

As an example, said filter layer can be situated between said effective detector areas and said base layer. Said filter layer may for example be positioned adjacent to said lower face of said base layer. Said filter layer may for example be positioned adjacent to said lower face of said base layer and adjacent to said first and second effective detector areas.

In another implementation, said first and second blocking areas are located between said filter layer and said base layer.

An arrangement according said second aspect can optionally be characterized in said filter layer comprising a multilayer optical component. In particular, said filter layer is a multilayer optical component, i.e. said filter layer constitutes a multilayer optical component. In particular, said filter layer comprises layers comprising dielectric materials with different refractive indices. Said multilayer optical component may for example comprise layers comprising silicon dioxide (SiO2) and/or layers comprising titanium dioxide (TiO2).

As another optional feature, said arrangement according to said second aspect may be characterized in said second blocking area consisting of said window area and in $\theta 2min=\theta 2max$ applying.

For example, said second material comprises an organic material and in particular a photoresist. In particular, said second material can be an organic material and for example a photoresist.

As another example, said second material comprises or is a semiconductor material and in particular an amorphous semiconductor material, more particularly amorphous silicon.

In an arrangement according to said second aspect, said arrangement can optionally comprise a light source. Said lower face of said base layer is facing said light source. Said light source is a light source for emitting said second light along an optical path from said light source towards and through said lower face, towards and through said base layer and towards and through said upper face. Advantages, properties and alternatives of an arrangement comprising a light source are the same as described in the first aspect of the invention.

Angle $\theta1max$ can for example be smaller or equal to 75°, in particular $\theta1max$ can be in a range from 10° to 65°, and more particularly $\theta1max$ can be in a range from 20° to 55°.

Angle $\theta2min$ can for example be smaller or equal to 25°, in particular $\theta2min$ can be in a range from 2° to 15° and in particular said $\theta2min$ being in a range from 5° to 10°.

As an optional feature, said first effective detector area and/or said second effective detector area comprises a multitude of individual subsensors comprised within one contiguous multisensor. In particular, said first effective detector area and/or said second effective detector area can comprise a set or selection of pixels comprised within one contiguous pixel-array.

In one possible embodiment of said second aspect, said first blocking area and/or said second blocking area has an elliptic shape. In particular, said first blocking area and/or said second blocking area feature a circular shape.

As an example, said first wavelength range is comprised in a wavelength range from 380 nm to 750 nm which is visible to the human eye, and said second wavelength range is comprised in a wavelength range from 750 nm to 10 μm.

Another optional feature for an arrangement according to the second aspect is that said arrangement comprises a first layer and a second layer. Said first layer is forming a joint interface with said second layer. Said second layer is substantially located between said blocking areas and said first layer, with said joint interface being referred to as reflection interface. Said first layer is featuring a detection face being different from said reflection interface, and said detection face is facing said first and second effective detector areas.

Said second layer is featuring a blocking face being different from said reflection interface, and said blocking face is facing said first and second blocking areas. Said reflection interface of said second layer is featuring a refractive index smaller than a refractive index said reflection interface of said first layer for any wavelength $\lambda1$ and for any wavelength $\lambda2$. $\theta TR$ designates an angle of total reflection for a respective wavelength, wherein $\theta TR$ is an angle of incidence relative to said reference plane. Furthermore, $\theta1max<\theta TR$ applies for any wavelength $\lambda1$ and for any wavelength $\lambda2$, and $\theta2max\geq\theta TR$ applies for any wavelength $\lambda1$.

An arrangement as described in the paragraph above features substantially the same advantages as an analogue arrangement according to the first aspect which comprises a reflection interface, a filter layer and said first and second blocking areas.

Said second layer of material can optionally be said base layer, with said lower face being said reflection interface, and with said upper face being said blocking face.

A third aspect of the invention concerns an arrangement for detecting first light and second light, with first light and second light having the same properties as described in conjunction with the second aspect of the invention. Said arrangement according to the third aspect comprises a first effective detector area and a second effective detector area, a base layer, a blocking area, a light source for emitting said second light and a control unit. The first and second effective detector areas and the light source are the same as described for the second aspect. Said base layer features an upper face and a lower face having the properties as described for the second aspect of the invention. Said upper face of said base layer is facing said light source, and second light is emitted by said light source towards and trough said upper face.

Said control unit is controlling said light source and said first and second effective detector area. Said control unit features a first operation mode with said light source emitting said second light at a first intensity and said first and second effective detector areas detecting incident light. Said control unit in addition features a second operation mode with said light source emitting said second light at a second intensity and said first and second effective detector area detecting incident light. Therein, said first intensity of said emitted second light is smaller than said second intensity. Optionally, said first intensity of said emitted second light is zero, i.e. said light source emits no second light when in said first operation mode.

Said blocking area is substantially made of a material having the same properties as described for said second material. Accordingly, said second material is substantially attenuative or substantially reflective for light of said first wavelength range and substantially transmissive for said light of said second wavelength range. Said blocking area is located at said upper face and is structured for substantially inhibiting a propagation of light of any chosen wavelength in said first wavelength range from said upper face to said second effective detector area for any angle of incidence $\theta$ relative to said reference plane (as described above) for which applies $0°\leq\theta\leq\theta1max$ for any wavelength comprised in said first wavelength range.

Said first effective detector area is substantially not influenced by said blocking area. Therefore, said first effective detector area detects during said first operation mode first and second light with any AOI. Through detection by said second effective detection area during said first operation mode, a background intensity of first and second light can be estimated for the second effective detector area. Through comparison of detected signals of said second effective detection area during said first operation mode and said second operation mode, a signal measured by said second effective detector area can be estimated which solely depends on said second light emitted by said light source. Said second light can therefore be separated from other light, for example from said first light. Said blocking area enhances a sensitivity of said second effective detector area for AOI which are smaller than or equal to said $\theta1max$. Therefore, the first and second effective detector areas detect light of different wavelength ranges and/or different ranges of AOI (i.e. of ranges of AOI which are weighed differently).

An arrangement according to the third aspect of the invention may feature only few and relatively cheap components, and it is easily and rapidly produced and features therefore a low production price.

An arrangement according to the third aspect of the invention is furthermore very energy efficient, since said control unit may reduce light emission by said light source when not needed for measuring a signal.

Said light source for said second light is tunable in intensity—or for example even switched on and off—by said control unit. Said light source can therefore be operated in a so-called pulsed mode.

A fourth aspect of the invention concerns an arrangement for detecting first light and second light as described for all other aspects of the invention which comprise a filter layer, however, in the fourth aspect of the invention, said filter layer comprises or is realized in form of a surface profile with sub-wavelength features (e.g., instead of a multi-layer thin film coating as described above). In particular, the property "sub-wavelength" means that the linear extension of the sub-wavelength features in a direction perpendicular to the before-mentioned reference plane is at most 0.5 times $\lambda 1$ or at most 0.5 times $\lambda 2$ or rather both. More particularly, it means that said linear extension is at most 0.3 times $\lambda 1$ and at most 0.3 times $\lambda 2$. The sub-wavelength features may in particular be periodic features, i.e. they show a spatial periodicity.

Diffractive features of said surface profile can be designed in a way to behave very similarly as interference filters (i.e. as the multilayer optical component as described above). In other words, transmission and reflection characteristics of the filter layer with said surface profile can be tailored by optimizing the diffractive features of the surface profile, and also the angular characteristics of reflection and/or of transmission of light as a function of the wavelength of said light can therefore be designed for surface profiles comparable and analogue to the angular characteristics of interference filters. An advantage of such a surface profile can be that it can be realized purely as a surface profile, i.e. fabrication by replication technologies is possible, and it can make possible to dispense with coating processes for producing the filter layer.

As an optional feature, the surface profile can be designed to provide transmission and reflection characteristics as described above for said multilayer optical component and to provide in addition a focusing function. The focusing function is an optical focusing effect caused by the design of the surface profile.

As a further optional feature, the surface profile can be combined with a multilayer optical component as described above. I.e. the filter layer in this case comprises both, a multilayer optical component and the surface profile. This way, an even better distinction between first and second light and/or between light with a specific first range of AOI and light with a specific second range of AOI can be achievable.

An arrangement according to the fourth aspect of the invention as described may comprise only few components and be robust. Fabrication of the surface profile can be simple and cost-effective. Typically, said surface profile is patterned in a sub-micron size range. The surface profile is typically patterned in a sub-wavelength size range.

A fifth aspect of the invention is an arrangement for detecting first light and second light, with first light and second light having the same properties as described for the second aspect of the invention. An arrangement according to the fifth aspect comprises a first effective detector area and a second effective detector area, a base layer and an optional first and a second filter layer. The first and second effective detector areas may have the same properties as described for the second aspect. Said optional first and the second filter layer feature the same properties as the filter layer described for the second aspect of the invention. Said base layer features an upper face and a lower face as described for the second aspect of the invention. Said base layer features furthermore inclined side faces interconnecting said upper face and said lower face. Said side faces are inclined relative to said upper and lower face, e.g., by an angle between 30° and 60°.

Said first filter layer, if present, is situated at a first side face of said base layer, typically covering at least a portion thereof, and said second filter layer is situated at a second side face of said base layer, typically covering at least a portion thereof. Said first side face is situated on a side of said base layer opposite to said second side face. Said first and second side faces may be aligned parallel to each other. Said first and second filter layers feature a flat, layer-like or plate-like shape. Said first filter layer and said second filter layer are separated by a distance between 0.1 and 10 times a (lateral) distance between said first and said second effective detector area.

In case the first filter layer is not provided, a mirror is present at its position instead, wherein this mirror is not a dichroic mirror.

Said first filter layer, if present, and otherwise the above-mentioned mirror, and said second filter layer are both positioned in an angle relative to said upper face of said base layer. Said first filter layer and said second filter layer act as dichroic mirrors which are transmissive for second light while being reflective for first light (or vice versa). The second filter layer is positioned such that second light transmitted by the second filter layer can be detected by the second effective detector area and that first light reflected by the second filter layer is reflected towards the first filter layer. The first filter layer is positioned such that first light reflected by the second filter layer towards the first filter layer is reflected again by the first filter layer and can subsequently be detected by the first effective detector area. Therefore, first and second light incident on the second filter layer are separated and detected separately by the first effective detector area (first light) and the second effective detector area (second light). As indicated above, the first filter layer can be replaced by a non-dichroic mirror in the same position.

Optionally, a blocking area and/or an additional filter layer is provided and arranged relative to the first filter layer (or otherwise to the non-dichroic mirror) such that it is prevented that second light can pass the first filter layer in direction of the first effective detector area. This way, a high percentage of light detected by the first effective detector area is first light reflected by the second filter layer. For example, such a blocking area may have the same properties as the first blocking area described for the second aspect of the invention.

A sixth aspect of the invention concerns an arrangement for detecting first light and second light, with first light and second light being the same as described for the second aspect of the invention. Said arrangement according to the sixth aspect comprises a first effective detector area and a second effective detector area, a base layer, a filter layer referred to as second filter layer and a filter layer referred to as third filter layer. The first and second effective detector areas and the light source are the same as described for the second aspect. Said base layer features an upper face and a lower face as described for the second aspect of the invention.

Said second filter layer is located on said upper face of said base layer. Said second filter layer is substantially transmissive for light of said second wavelength range, and substantially inhibits transmission of light of said first wavelength. On the other hand, said third filter layer is located on said lower face of said base layer. Said third filter layer is substantially transmissive for light of said first wavelength range, and substantially inhibits transmission of light of said second wavelength.

Said third filter layer is structured for substantially allowing a propagation of light of any wavelength in said second wavelength range from said upper face to said second effective detector area for angles of incidence of 0° to θ5max for said wavelength in said first wavelength range only, whereas said second filter layer is structured for substantially inhibiting a propagation of light of any wavelength in said first wavelength range from said upper side of said first layer to said second effective detector area for any angle of incidence.

And said second filter is structured for substantially inhibiting a propagation of light of any wavelength in said first wavelength range from said upper side of said first layer to said first effective detector area for angles of incidence of 0° to an AOI θ4min for said wavelength in said first wavelength range and for angles of incidence of above said AOI θ4max for said wavelength in said first wavelength range. On the other hand, said third filter layer is structured for substantially inhibiting a propagation of light of any wavelength in said second wavelength range from said upper side of said first layer to said first effective detector area for any angle of incidence.

An arrangement according to the sixth aspect of the invention as described can be simple in structure.

For example, said arrangement can be produced by coating a glass slab (as said first layer), on a first side with a filter, e.g., a band-pass filter, (as said second filter) for letting pass wavelengths in said first wavelength range, and on a second side opposite to said first side with another filter, e.g., another band-pass filter, (said second filter) for letting pass wavelengths in said second wavelength range. Said glass slab features areas left uncoated, i.e. said filters are structured to allow all wavelengths to pass through the respective holes in the respective filter.

Figure 2:
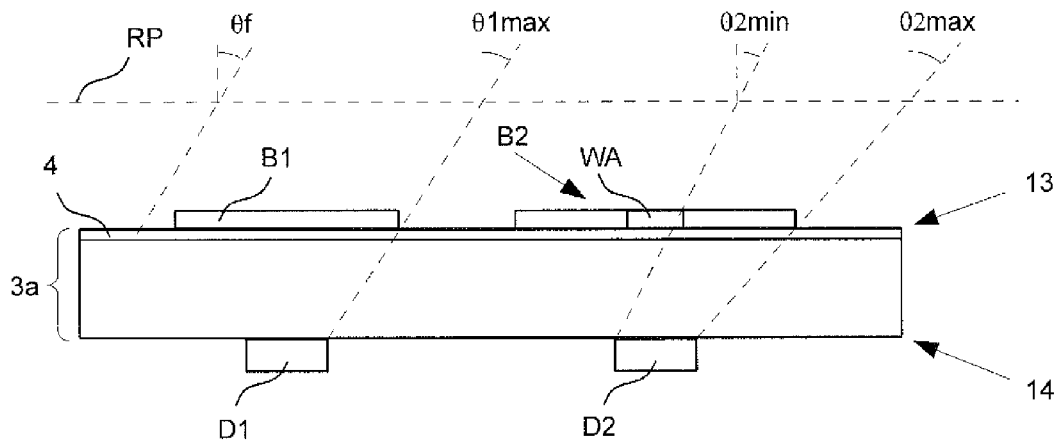
Figure 3:
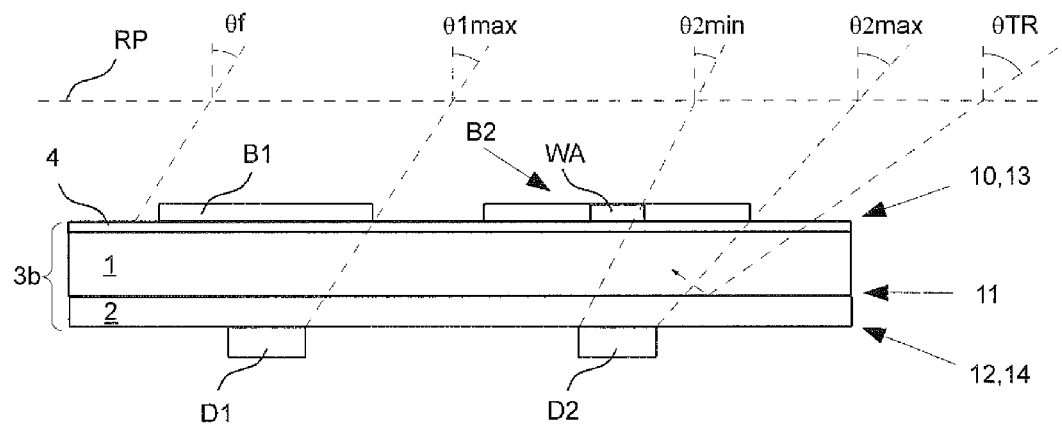
Figure 4:
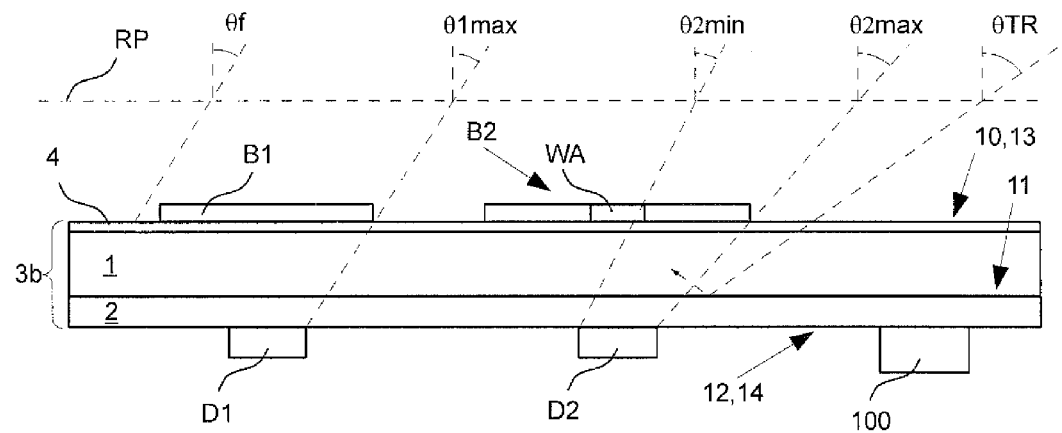
Figure 5:
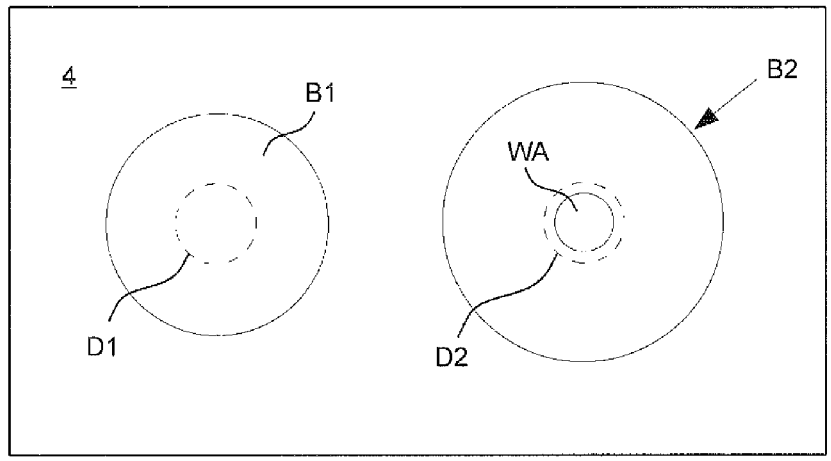
Figure 6:
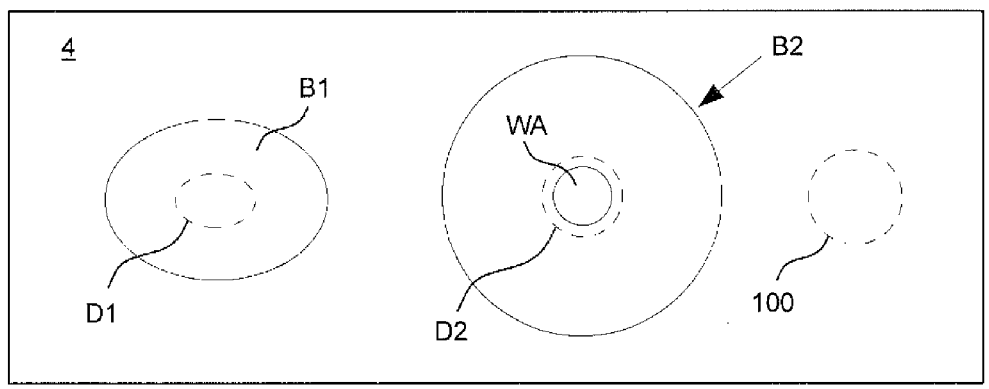
Figure 7:
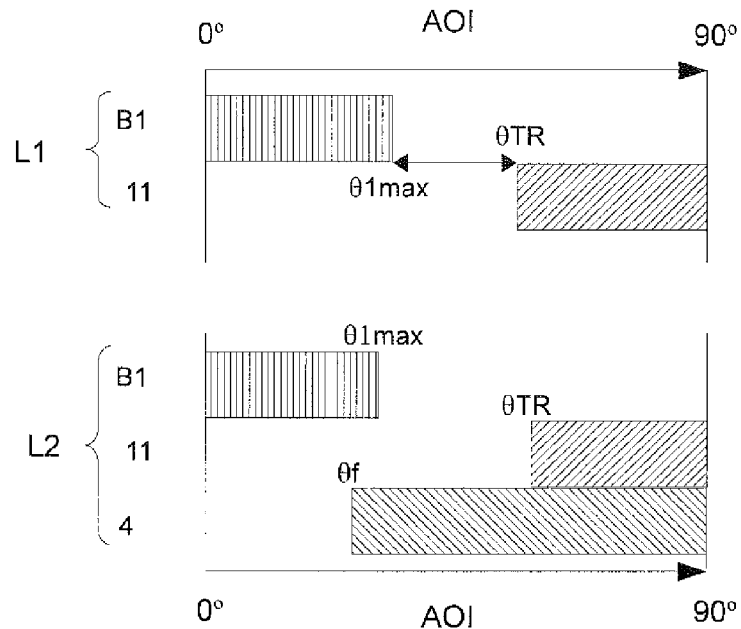
Figure 8:
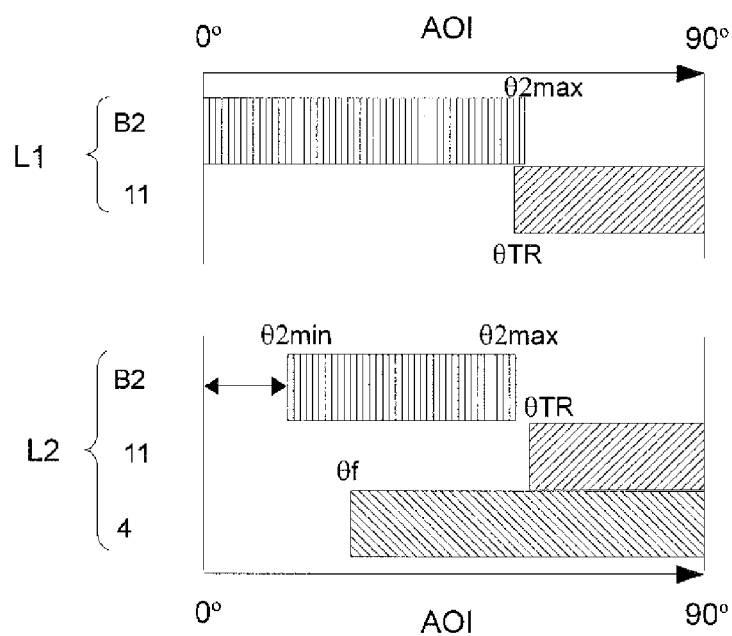
Figure 9:
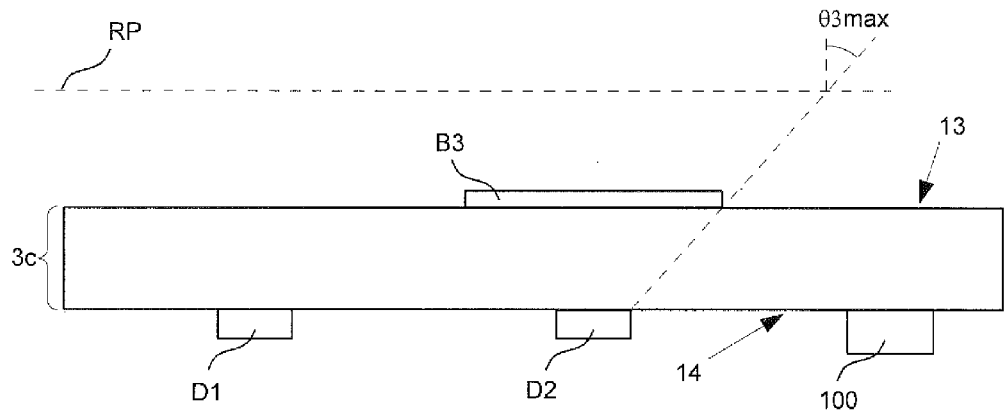
Figure 10:
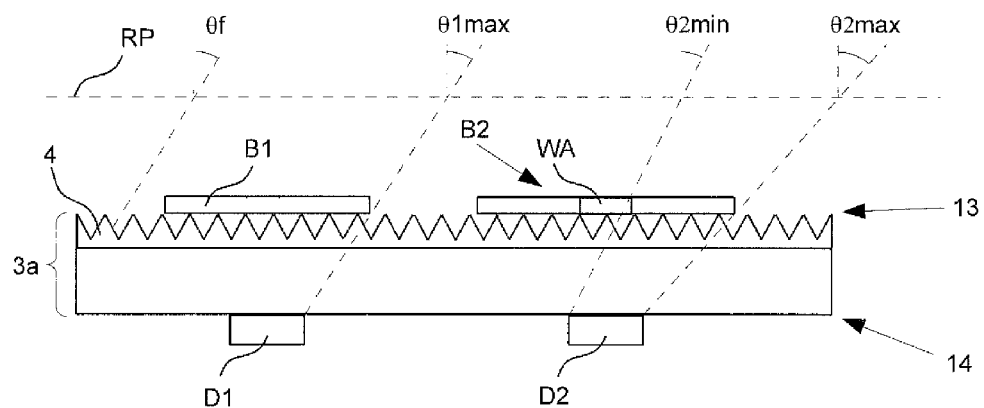
Figure 11:
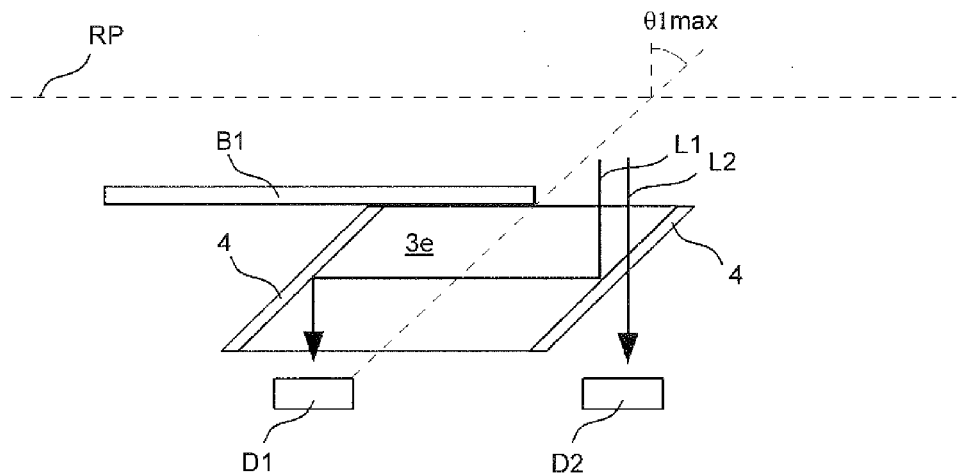
Figure 12:
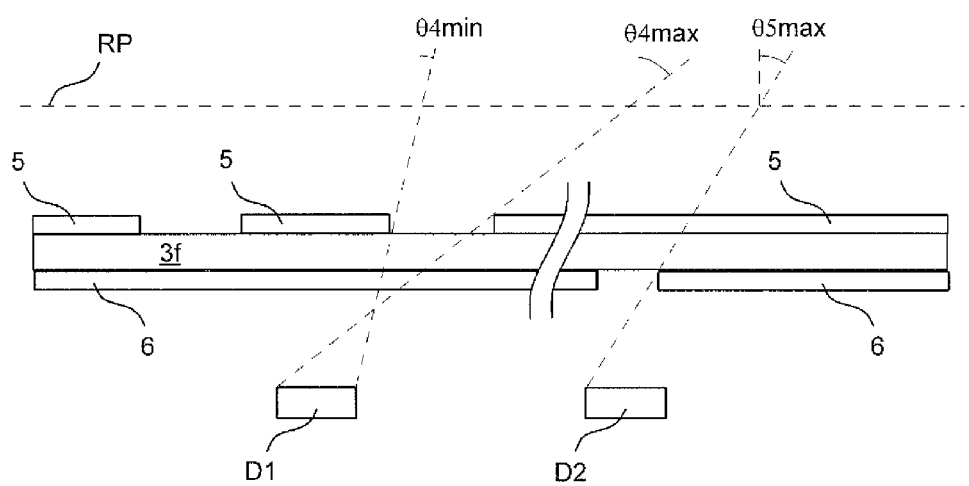

The subject matter of the invention will be explained in more detail in the following text with reference to exemplary embodiments which are illustrated in the attached drawings, in which:

FIG. 1 schematically shows a cross section of an arrangement according to said first aspect of the invention in side view;

FIG. 2 schematically shows a cross section of an arrangement according to said second aspect of the invention in side view;

FIG. 3 schematically shows a cross section of an arrangement according to said second aspect of the invention additionally comprising a reflection interface in side view;

FIG. 4 schematically shows a cross section of an arrangement analogue to FIG. 3, additionally comprising a light source in side view;

FIG. 5 schematically shows the arrangement of FIG. 3 in top view;

FIG. 6 schematically shows the arrangement of FIG. 4 in top view;

FIG. 7 schematically shows at which AOI light incident on said first effective detector area of the arrangement of FIG. 3 is substantially unattenuated;

FIG. 8 schematically shows at which AOI light incident on said second effective detector area of the arrangement of FIG. 3 is substantially unattenuated;

FIG. 9 schematically shows a cross section of an arrangement according to said third aspect of the invention in side view;

FIG. 10 schematically shows a cross section of an arrangement according to said fourth aspect of the invention in side view;

FIG. 11 schematically shows a cross section of an arrangement according to said fifth aspect of the invention in side view;

FIG. 12 schematically shows a cross section of an arrangement according to said sixth aspect of the invention in side view.

FIGS. 1 to 4 and 9 to 12 each schematically illustrate a configuration of an arrangement according to an aspect of the invention. For illustrating specific features of these arrangements concerning angles of propagating light, dashed lines act as guides to the eye and for visualizing relevant angles. Such dotted lines neither represent light beams nor a propagation path of light. Accordingly, optical effects such as for example refraction and deflection which of course occur and are of relevance when light propagates in such an arrangement are not shown in FIGS. 1 to 4 and 9 to 12 in order to provide a clear and simple presentation. The respective angles are all illustrated at a reference plane RP and thus (at least in most cases) not at the respective place where they are described by propagating light.

FIG. 1 schematically shows a cross section of an arrangement according to said first aspect of the invention in side view. Said arrangement comprises a plane slab-shaped first layer 1 and a plane slab-shaped second layer 2. The first layer 1 is a rectangular glass slab of, e.g., 800 micrometers thickness. The second layer 2 is a rectangular slab of, e.g., 500 micrometers thickness consisting of material with a refractive index smaller than the refractive index of the first layer 1. The first layer 1 is forming a joint interface with said second layer 2 which is referred to as reflection interface 11. Opposite to the reflection face 11, the first layer 1 features a face 10 referred to as blocking face 10. And opposite to the reflection face 11, the second layer 2 features a face referred to as detection face 12. The detection face 12 is, in the illustrated example aligned parallel to the reflection face 11 and to the blocking face 10. A first blocking area B1 and a second blocking area B2 are positioned adjacent to the blocking face 10. A first effective detector area D1 and a second effective detector area D2 are positioned adjacent to the detection face 12. The effective detector areas D1 and D2 do not overlap, and the blocking areas B1 and B2 do not overlap.

The second blocking area B2 comprises a window area WA which is substantially transmissive for light of wavelengths $\lambda 2$. $\lambda 2$ designates a wavelength comprised in a second wavelength range with wavelengths between 840 and 860 nanometers, and second light L2 consists of one or more wavelengths of said second wavelength range only. Furthermore, the window area WA inhibits propagation of light of wavelength $\lambda 1$. $\lambda 1$ designates a wavelength comprised in a first wavelength range with wavelengths between, e.g., 400 and 650 nanometers, and first light L1 consists of one or more wavelengths of said first wavelength range only. The window area WA is, e.g., made of a photoresist.

The first blocking area B1 and the second blocking area B2 with exception of the window area WA inhibit propagation of light of wavelength $\lambda 1$ and of wavelength $\lambda 2$. This can be accomplished by either using a material which is highly absorptive (i.e. highly attenuative) for light of wavelength $\lambda 1$ and of wavelength $\lambda 2$ such as, e.g., black resist, carbon black or black paint, or by using a material which is highly reflective for light of wavelength $\lambda 1$ and of wavelength $\lambda 2$ such as an aluminium.

The first blocking area B1 is structured to substantially inhibit propagation of light of wavelength $\lambda 1$ from the blocking face 10 to said first effective detector area D1 for all angles of incidence $\theta$ relative to a reference plane RP for which applies $0° \leq \theta \leq \theta 1 max$. Being structured can in particular mean that the respective element, in this case the first blocking area B1, features suitable shape, size, optical qualities and position (in this case relative to area D1) to fulfill said requirements, wherein said requirement, is in this case, mean to substantially inhibit propagation of light of wavelength $\lambda 1$ from the blocking face 10 to said first effective detector area D1 for all angles of incidence $\theta$ relative to a reference plane RP for which applies $0° \leq \theta \leq \theta 1 max$). $\theta 1 max$ designates an angle of incidence relative to the reference plane RP for which applies $\theta 1 max < \theta TR$ for any light of wavelength $\lambda 1$ wherein $\theta TR$ designates an angle of total reflection, cf. below. It is noted that angles such as a specific angle of total reflection can exhibit a wavelength dependence (even though that dependence may be small, in particular in case low-dispersion materials are involved), and therefore, it is occasionally explicitly referred to a specific wavelength or wavelength range when referring to specific angles. The material of the first blocking area B1 is substantially attenuative or substantially reflective for light of any wavelength λ1 and λ2 and therefore inhibits propagation of such light through the blocking area B2.

The reference plane RP is a plane parallel to the detector face 12. Alternatively, reference plane RP could also have been defined differently, e.g., as being parallel to the blocking face 10. The reference plane RP is introduced and used mainly because it provides an easy way of comparing different AOI (angles of incidence). θTR designates an angle of total reflection for light of a respective wavelength λ1 or λ2 incident on the reflection interface 11, wherein θTR designates an angle of incidence relative to the reference plane RP. The angle of total reflection θTR is an AOI featuring a lowest value of all AOI at which total reflection at a respective interface occurs. Total reflection occurs at the reflection interface 11 since a refractive index of the first layer 1 at the reflection interface 11 is larger than a refractive index of the second layer 2 at the reflection interface 11. The angle of total reflection θTR depends on said refractive indices.

It is noted that, as a general rule, all AOI defined by spatial conditions and/or optical properties (in particular refractive index) of elements present on a respective path of propagation can depend on the wavelength of the respective light.

Since the first blocking area B1 inhibits propagation of light of both wavelengths λ1 and λ2, the property of being structured to inhibit propagation of light of wavelength λ1 usually effects an inhibition of propagation of light of wavelength λ2 as well. θ1max for light of wavelength λ2 is given by the corresponding optical properties of elements on a path of propagation of light of wavelength λ2.

The window area WA is structured for substantially allowing a propagation of light of any wavelength λ2 from the blocking face 10 to said second effective detector area D2 for any angle of incidence θ relative to the reference plane RP for which applies 0°≤θ≤θ2min for the respective wavelength λ2. θ2min designates an angle of incidence relative to said reference plane RP for which applies θ2min>0°. Therefore, the window area WA allows second light L2 with AOI smaller than θ2min to be measured by the second effective detector area D2. Due to the material properties of the window area WA, the propagation of light of any wavelength λ1 from the blocking face 10 to said second effective detector area D2 is substantially inhibited.

The second blocking area B2 is structured for substantially inhibiting a propagation of light of any wavelength λ1 from the blocking face 10 to the second effective detector area D2 for all angles of incidence θ relative to the reference plane RP for which applies 0°≤θ≤θ2max, with θ2max designating an angle of incidence relative to the reference plane RP for which applies θ2max≥θTR for the respective wavelength λ1. The material of the second blocking area B2 both inside and outside the window area WA is substantially attenuative or substantially reflective for light of any wavelength λ1 and therefore inhibits propagation through the blocking area B2.

The second blocking area B2 is structured for substantially inhibiting propagation of light of any wavelength λ2 from the blocking face 10 to the second effective detector area D2 for all angles of incidence θ relative to the reference plane RP for which applies θ2min≤θ≤θ2max. θ2max designates an angle of incidence relative to the reference plane RP with θ2max≥θTR for the respective wavelength λ2. Since the window area WA allows a propagation of light of any wavelength λ2 up to an AOI θ which is smaller than θ2min, light of any wavelength λ2 is only inhibited in its propagation through areas of the second blocking area B2 outside the window area WA. Here, θ2min<θ2max applies for the respective wavelength λ2. Furthermore, light of any wavelength λ2 is inhibited in its propagation from the blocking face 10 towards the second detector area D2 for all AOI θ which are equal to or larger than θTR. And since θ2max≥θTR, light of any wavelength λ2 can only be detected by the second effective detector area D2 trough the window area WA with an AOI with accordingly small values.

And light of any wavelength λ1 can not at all reach the second effective detector area D2 and be detected there, since light of any wavelength λ1 is inhibited in its propagation from the blocking face 10 towards the second detector area D2 for all possible AOI either through the second blocking area B2 or through total reflection at the reflection interface 11.

Summarized, the first effective detector area D1 in FIG. 1 can detect substantially unattenuated light of any wavelength λ1 with AOI θ for which applies θ1max<θ<θTR and can detect substantially unattenuated light of any wavelength λ2 with AOI θ for which applies θ1max<θ<θTR. The second effective detector area D2 can not at all detect light of any wavelength λ1, but can detect light of any wavelength λ2 for which applies 0°≤θ<θ2min.

The first and second effective detector areas D1 and D2 may, in the present case, feature identical detection characteristics and be identically built, but they are due to the described arrangement illustrated in FIG. 1 sensitive to different wavelength ranges at different angles of incidence.

FIG. 2 schematically shows a cross section of an arrangement according to said second aspect of the invention in side view. Said arrangement comprises a plane slab-shaped base layer 3a. The base layer 3a features an upper face 13 facing first and second blocking areas B1 and B2, and the base layer 3a features a lower face 14 facing first and second effective detector areas D1 and D2. The upper face 13 is located on a side of the base layer 3a opposite to the lower face 14.

The first and second blocking areas B1 and B2 and the first and the second effective detector areas D1 and D2 may be identical with those described in FIG. 1 including being structured in the same way. The first wavelength range and the second wavelength range, and thus λ1 and λ2, may also be the same in the arrangements in FIG. 1 and FIG. 2.

The arrangement in FIG. 2 features geometrical proportions and thus also angular correlations between the first blocking area B1 and the first effective detector area D1 and also between the second blocking area B2 and the second effective detector area D2 which are analogue to those described for FIG. 1. Therefore, the first blocking area B1 inhibits propagation of light of any wavelengths λ1 and λ2 from the upper face 13 to the first effective detector area D1 for AOI smaller than or equal to θ1max for the respective wavelength λ1 or λ2. And the second blocking area B2 inhibits propagation of light of any wavelength λ1 from the upper face 13 to the second effective detector area D2 for AOI smaller than or equal to θ2max for the respective wavelength λ1. Regarding light of any wavelength λ2, the second blocking area B2 inhibits propagation of corresponding light from the upper face 13 to the second effective detector area D2 for AOI which are in the range from greater than or equal to θ2min to smaller than or equal to θ2max for the respective wavelength λ2.

The arrangement in FIG. 2 is different from the arrangement in FIG. 1 mainly in the aspect that the base layer 3a in FIG. 2 corresponds to both the first layer 1 and second layer 2 in FIG. 1. Therefore, the upper face 13 corresponds to the blocking face 10, and the lower face 14 corresponds to the detection face 12. The layer 3a consists of a glass slab of 1000 micrometers thickness and a filter layer 4 of typically several micrometers thickness. In particular, the filter layer 4 is between 1 and 6 micrometers thick. The filter layer 4 is positioned adjacent to the upper face 13. In other words, the upper face 13 is established by the filter layer 4. The filter layer 4 can specifically be a vacuum deposited multilayer stack of alternately stacked SiO2 layers and TiO2 layers.

Filter layer 4 transmits light of any wavelength λ1, but acts a band-pass filter for light of wavelengths λ2, wherein a central wavelength of this optical band-pass filter depends on the AOI of the light of the wavelength λ2. Therefore, light of wavelengths λ1 is not or not substantially affected by the filter layer 4. But light of wavelength λ2 is affected because its transmitted intensity through the filter layer 4 notably depends on its AOI relative to said reference plane RP. Due to a dependence of a light path length on an AOI, dielectric filters typically show a high AOI sensitivity, especially with increasing AOI. This allows to design spectral characteristics of the dielectric filter in such way, that e.g. the transmission of L2 is high at low AOI but strongly reduced at high AOIs.

This is used for considerably reducing the intensity of light of wavelength λ2 incident with AOI above θf reaching the second effective detector area D2. θf filter layer 4 is smaller than θ2max for light of wavelengths λ2. In consequence, light of wavelengths λ2 potentially incident on the second effective detector area D2 with an AOI greater than or equal to θ2min is either inhibited in its propagation by the second blocking area B2 and/or strongly attenuated by the filter layer 4.

The filter layer 4 is also used for reducing the intensity of light of wavelength λ2 with AOI above θf incident on the first effective detector area D1. θf filter layer 4 is smaller than θ1max for light of wavelengths λ2. In consequence, any light of a wavelength λ2 potentially incident on the first effective detector area D1 is either inhibited by the first blocking area B1 and/or attenuated by the filter layer 4.

Summarized, the first effective detector area D1 in FIG. 2 can detect substantially unattenuated light of any wavelength λ1 with AOI θ for which applies θ>θ1max. Light of a wavelength λ2 does not reach area D1 (through base layer 3a) and therefore cannot be detected there. The second effective detector area D2 can detect substantially unattenuated light of any wavelength λ1 with AOI θ for which applies θ>θ2max for the respective wavelength λ1 and can detect substantially unattenuated light of any wavelength λ2 for which applies 0°≤θ≤θ2min for the respective wavelength λ2.

The first and second effective detector areas D1 and D2 may, in the present case, feature identical detection characteristics and be identically built, but they are due to the described arrangement illustrated in FIG. 2 sensitive to different wavelength ranges at different angles of incidence.

FIG. 3 schematically shows a cross section of an arrangement according to said second aspect of the invention in side view, with said arrangement additionally comprising a reflection interface 4. The arrangement in FIG. 3 is largely identical to the arrangement of FIG. 2, but base layer 3b in FIG. 3 comprises, in addition to filter layer 4 (which is as described for FIG. 2), a first layer 1 and a second layer 2 which are as described for FIG. 1. Otherwise, the elements in FIG. 3 are the same as the elements (with the same respective references) already described in FIGS. 1 and 2, respectively. These elements feature identical properties except where differences are described.

The arrangement in FIG. 3 features both, a filter layer 4 with a threshold angle of incidence θf and an interference interface 11 with an angle of total reflection θTR. In this example, θf is smaller than θTR. This condition θf<θTR combined with the angular correlations between the first blocking area B1 and the first effective detector area D1 and the angular correlations between the second blocking area B2 and the second effective detector area D2 (which are analogue to FIGS. 1 and 2, respectively) results in an arrangement which is able to distinguish between first light L1 within a first range of AOI and second light L2 within a second range of AOI. This first and second range of AOI are different from each other and do not overlap, i.e. they have no AOI in common. In the first range of AOI, light of wavelengths λ1, but no light of wavelengths λ2 will reach first effective detector area D1, and in the second range of AOI, light of wavelengths λ2, but no light of wavelengths λ1 will reach second effective detector area D1.

Summarized, the first effective detector area D1 in FIG. 3 can detect substantially unattenuated light of any wavelength λ1 for AOI θ for which applies θ1max<θ<θTR. Light of any wavelength λ2 potentially incident on the first effective detector area D1 is either inhibited by the first blocking area B1, totally reflected by the reflection interface 11 and/or attenuated (optionally totally attenuated) by the filter layer 4. The second effective detector area D2 can detect substantially unattenuated light of any wavelength λ2 for which applies 0°≤θ<θ2min for the respective wavelength λ2. Light of any wavelength λ1 potentially incident on the second effective detector area D2 is either inhibited by the second blocking area B2 or totally reflected by the reflection interface 11.

The first and second effective detector areas D1 and D2 may, in the present case, feature identical detection characteristics and be identically built, but they are due to the described arrangement illustrated in FIG. 3 sensitive to different wavelength ranges at different angles of incidence.

FIG. 4 schematically shows a cross section of an arrangement largely identical to the one of FIG. 3 in side view which, however, additionally comprises a light source 100. All elements in FIG. 4 except for the light source 100 may be identical to those described for FIG. 3 and may feature the same properties.

The light source 100 is, e.g., an LED positioned at the detection face 12 (which corresponds to lower face 14) and is located close to the second effective detector area D2. The light source 100 can emit second light L2 which is transmitted through the detection face 12, the first layer 1, the second layer 2, the filter layer 4 and the blocking face 10 (which corresponds to upper face 13). Relative to the second blocking area B2 and also relative to the first blocking area B1, light source 100 is located such that any second light L2 emitted by light source 100 with an AOI smaller than 30° with respect to reference plane RP features a path not crossing the first or second blocking area B1, B2. The advantages of light being emitted through a filter layer and being detected through the same filter layer again are described above.

FIG. 5 schematically shows the arrangement of FIG. 3 in top view. The first and second blocking areas B1, B2 as well as the window area WA are of circular shape in a top view. The first and second effective detector areas D1, D2 are also of circular shape (shown in dashed lines). The first blocking area B1 and the first effective detection area D1 are mutually concentric in this view (i.e. in a projection onto the reference plane). Furthermore, the second blocking area B2, the window area WA and the second effective detection area D2 are mutually concentric in this view as well. This geometry results in the effective detector areas D1, D2 being equally accessible for respective first and/or second light L1, L2 with a specific AOI coming from any direction. In other words, this geometry allows measuring first light L1 and second light L2 each with a specific AOI but coming from any direction without preference for specific directions. Therefore, light incident with specific AOI and a specific intensity incident from a specific direction results in the same detection signal as light incident with that same specific AOI and that same specific intensity incident from another direction.

FIG. 6 schematically shows the arrangement of FIG. 4 in top view. The first blocking area B1 as well as the first effective detector area D1 (shown in dashed lines) feature a non-circular elliptic shape in the top view and are arranged concentrically in this perspective (i.e. in a projection to the reference plane). Concentric ellipses are ellipses of similar shape whose outlines can be projected on top of each other by proportional scaling geometrically originating from one point in space.

The second blocking area B2 and the second effective detector area D2 (shown in dashed lines) as well as the window area WA are of circular shape and concentrically arranged in this perspective (i.e. in a projection to the reference plane). The light source 100 is also circular, more particularly, the light source 100 has a circular active area (from which light is emitable).

In FIG. 6, the circular light source 100 features a center point which is located on a long axis of symmetry of the elliptic first blocking area B1 (and therefore also of the first effective detector area D1). The circular second blocking area B2 (and therefore also window area WA and the second effective detector area D2) features a center point which is also located on the long axis of symmetry of the elliptic first blocking area B1. The geometry of the arrangement in FIG. 6 allows to uniformly measure second light L2 incident with a specific AOI incident from any direction towards the second effective detector area D2. In other words, second light L2 incident with a specific AOI is detected by the second effective detector area D2 without preference for the direction from which the light is incident under said specific AOI.

Due to the geometry of the arrangement in FIG. 6, light incident with a specific AOI detected by the first effective detection area is weighted stronger when incident from a direction along a short axis of symmetry of the elliptic first blocking area B1 than light incident from a direction along a long axis of symmetry of the elliptic first blocking area B1.

FIG. 7 schematically illustrates at which AOI incident light reaches the first effective detector area D1 of the arrangement of FIG. 3 substantially unattenuated and at which AOI light does not at all reach the first effective detector area or reaches it only substantially attenuated. The horizontal axis represents an angle of incidence AOI range from 0° to 90°.

The upper half of FIG. 7 concerns first light L1 potentially incident on the first effective detector area D1. First light L1 is inhibited to propagate towards the first effective detector area D1 by the first blocking area B1 for all AOI smaller than or equal to θ1max (illustrated by a bar with vertical lines). First light L1 is also inhibited to propagate towards the first effective detector area D1 by the reflection layer 11 for all AOI larger than or equal to θTR (illustrated by a bar with diagonal lines pointing downwards to the left). Therefore, only first light L1 with an AOI θ for which applies θ1max<θ<θTR can be detected by the first effective detector area D1 (symbolized by the double arrow).

The lower half of FIG. 7 concerns second light L2 potentially incident on the first effective detector area D1. Second light L2 is inhibited to propagate towards the first effective detector area D1 by the first blocking area B1 for all AOI smaller than or equal to θ1max (illustrated by a bar with vertical lines). Second light L2 is also inhibited to propagate towards the first effective detector area D1 by the reflection layer 11 for all AOI larger than or equal to θTR (illustrated by a bar with diagonal lines pointing downwards to the left). Furthermore, second light L2 is attenuated (typically substantially attenuated or even fully attenuated, i.e. eliminated, blocked) by the filter layer 4 for all AOI larger than or equal to θf (illustrated by a bar with diagonal lines pointing downwards to the right). Since θ1max is larger than θf for second light L2, second light L2 of any AOI directed from the blocking face 10 towards the first effective detector area D1 is attenuated and/or inhibited to propagate towards the first effective detector area D1. In other words, the first effective detector area D1 detects no unattenuated second light L2 or no second light L2 at all (depending on the degree of attenuation by the filter layer 4).

FIG. 8 schematically illustrates at which AOI incident light reaches the second effective detector area D2 of the arrangement of FIG. 3 substantially unattenuated and at which AOI light does not at all reach the second effective detector area or reaches it only substantially attenuated. The horizontal axis represents an angle of incidence AOI range from 0° to 90°.

The upper half of FIG. 8 concerns first light L1 potentially incident on the second effective detector area D2. First light L1 is inhibited to propagate towards the second effective detector area D2 by the second blocking area B2 for all AOI smaller than or equal to θ2max (illustrated by a bar with vertical lines). First light L1 is also inhibited to propagate towards the second effective detector area D2 by the reflection layer 11 for all AOI larger than or equal to θTR (illustrated by a bar with diagonal lines pointing downwards to the left). Since θ2max is larger than θTR, first light L1 of any AOI is inhibited to propagate towards the second effective detector area D2. In other words, the second effective detector area D2 cannot detect any first light L1.

The lower half of FIG. 8 concerns second light L2 potentially incident on the second effective detector area D2. Second light L2 is inhibited to propagate towards the second effective detector area D2 by the second blocking area B2 for all AOI larger or equal to θ2min up to AOI smaller than or equal to θ2max (illustrated by a bar with vertical lines). Second light L2 is also inhibited to propagate towards the second effective detector area D2 by the reflection layer 11 for all AOI larger than or equal to θTR (illustrated by a bar with diagonal lines pointing downwards to the left). Furthermore, second light L2 is attenuated (typically substantially attenuated or even fully attenuated, i.e. eliminated, blocked) by the filter layer 4 for all AOI larger than or equal to θf (illustrated by a bar with diagonal lines pointing downwards to the right). Since θ2max is larger than θf for second light L2, and since θ2min is smaller than θf for second light L2, only second light L2 with an AOI smaller than θ2min is detected by the second effective detector area D2 (symbolized as a double arrow).

From FIGS. 7 and 8, it is readily deduced, what analogous figures would look like for other embodiments such as those of FIGS. 1, 2, 4.

FIG. 9 schematically shows a cross section of an arrangement according to said third aspect of the invention in side view. A planar base layer 3c features an upper face 13 and a lower face 14. A reference plane RP is positioned parallel to said planar base layer 3c. A first detector area D1, a second detector area D2 and a light source 100 are positioned at different positions on the lower face 14. The light source 100 emits second light L2 towards and trough said upper face 13. A blocking area referred to as third blocking area B3 is positioned on the upper face 13. The third blocking area B3 is substantially made of a material as described for the second material above. Accordingly, said third blocking area B3 is substantially attenuative or substantially reflective for first light L1 and substantially transmissive for said second light L2. The third blocking area is structured and positioned relative to the second detector area D2 such that it is substantially inhibiting a propagation of first light L1 from said upper face 13 to said second effective detector area D2 for any angle of incidence θ relative to said reference plane RP for which applies 0°≤θ≤θ3max for any wavelength comprised in said first light L1. The first effective detector area D1 is substantially not influenced by said third blocking area B3.

Furthermore, in the third aspect of the invention, the arrangement comprises a control unit (not shown) which controls light source 100. Said control unit features a first operation mode in which said light source 100 emits said second light L2 at a first intensity and said first effective detector area D1 and said second effective detector area D2 detect incident light. Said control unit also features a second operation mode in which said light source 100 emits said second light L2 at a second intensity and first effective detector area D1 and said second effective detector area D2 detect incident light. Therein, said first intensity of said emitted second light L2 is smaller than said second intensity. In one embodiment, said first intensity of said emitted second light is zero, i.e. said light source 100 emits no second light L2 in said first operation mode.

Said first effective detector area D1 is substantially not influenced by said third blocking area B3. Therefore, said first effective detector area D1 detects, during said first operation mode, first light L1 and second light L2 incident at any AOI relative to the reference plane RP. Through detection by said second effective detection area D2 during said first operation mode, a background intensity of first light L1 and second light L2 can be estimated for the second effective detector area D2. Through comparison of detected signals of said second effective detection area D2 during said first operation mode and said second operation mode, a signal measured by said second effective detector area D2 only depending of said second light L2 emitted by said light source 100 can be estimated. Said second light L2 can therefore be separated from other light, for example from said first light L1. Said third blocking area B3 enhances a sensitivity of said second effective detector area D2 for AOI which are smaller than or equal to said θ3max. Therefore, the first effective detector area D1 and the second effective detector area D2 both detect light of different wavelength ranges and/or different ranges of AOI (i.e. of ranges of AOI which are weighed differently).

FIG. 10 schematically shows a cross section of an arrangement according to said fourth aspect of the invention in side view. The arrangement in FIG. 10 is analogue to the arrangement in FIG. 2 with a single difference: the filter layer 4 which in FIG. 2 is a multilayer stack is in FIG. 10 a filter layer 4 featuring a surface profile with sub-wavelength features. The surface profile (in FIG. 10 schematically illustrated by a triangular patterning of much exaggerated dimensions of the upper face 13) of the filter layer 4 is designed in such a way that it has the same optical features as a multilayer stack such as the filter layer 4 in FIG. 2. More particularly, the filter layers 4 in FIG. 2 and in FIG. 10 feature the same diffractive features (i.e. the same transmission and reflection characteristics) and the same angular characteristics of reflection and transmission as a function of the wavelength, but the filter layer 4 in FIG. 2 is a multilayer stack and the filter layer 4 in FIG. 10 features a surface profile with structures smaller than the wavelength of the light involved.

FIG. 11 schematically shows a cross section of an arrangement according to said fifth aspect of the invention in side view. A planar base layer 3e features an upper face and a lower face opposite to said upper face. The base layer 3e features furthermore inclined side faces interconnecting said upper face and said lower face. Said side faces are inclined relative to said upper and lower face in an angle of, e.g., 45° as drawn in FIG. 11. The upper and lower faces of the base layer 3e are aligned parallel to each other as well as parallel to a reference plane RP.

Said side faces both are provided with a first and a second filter layer 4 which in the illustrated example cover the entire side faces. Said filter layers 4 feature the same properties as described for the second embodiment and for FIG. 2, respectively. Said side faces are parallel to each other and are separated by a distance comparable to a distance between a first effective detector area D1 and a second effective detector area D2, e.g., between 0.5 times and 2 times said distance. The lower face of the base layer 3e faces the first effective detector area D1.

The second filter layer 4 is positioned relative to the second effective detector area D2 such that first light L1 incident perpendicularly onto the base layer 3e penetrates the upper face of the base layer 3e and is reflected by the second filter layer 4 into the base layer 3e and towards the first filter layer 4 at the opposite side face of the base layer 3e. Second light L2 perpendicularly incident on the base layer 3e penetrates the upper face of the base layer 3e and it penetrates the second filter layer 4 and finally is incident on the second effective detector area D2.

The first filter layer 4 is positioned relative to the first effective detector area D1 such first light L1 which is reflected by the second filter layer 4 into the base layer 3e and towards the first filter layer 4 is furthermore reflected towards the first effective detector area. Furthermore, the upper face of base layer 3e is in touch with a first blocking area B1 which is substantially attenuative or substantially reflective for both first light L1 and second light L2. The first blocking area is structured and positioned relative to the first detector area D1 such that it substantially inhibits a propagation of both first light L1 and second light L2 from said upper face of the base layer 3e to the first effective detector area D1 for any angle of incidence θ relative to said reference plane RP for which applies 0°≤θ≤θ1max for any wavelength comprised in both first light L1 and second light L2.

The way of functioning of the fifth aspect of the invention has been described further above in more detail. As has been explained, the second filter layer can be a dichroic mirror as can the first filter layer. But it can also be provided that the first filter layer is replaced by a (non-dichroic) mirror in the same location as the first filter layer.

FIG. 12 schematically shows a cross section of an arrangement according to said sixth aspect of the invention in side view. A planar base layer 3f is on one face in touch with a filter layer referred to as second filter layer 5 which partially covers the base layer 3f. The base layer 3f is furthermore in touch with a third filter layer 6 on a face opposite to said face which is in touch with the second filter layer 5. The third filter layer 6 partially covers the corresponding side of base layer 3f and is positioned between the base layer 3f on the one hand and a first effective detector area D1 and a second effective detector area D2 on the other hand. A reference plane RP is positioned parallel to the base layer 3f.

Said second filter layer 5 is substantially transmissive for second light L2, and substantially inhibits transmission of second light L2. Said third filter layer 6 is substantially transmissive for first light L1, and substantially inhibits transmission of first light L1.

Said second filter layer 5 features openings arranged relative to the first effective detector area D1 which allow first light L1 to propagate through the second filter layer 5 to the first effective detector area D1 if their AOI relative to the base layer is larger than an AOI θ4min and smaller than or equal to an AOI θ4max. In other words, the second filter layer 5 is structured for substantially allowing a propagation of first light L1 from the second filter layer 5 to the first effective detector area D1 for angles of incidence (relative to the reference plane RP) of θ4min to θ4max for first light L1.

The second filter layer 5 is furthermore structured for substantially inhibiting a propagation of first light L1 from the second filter layer 5 to the second effective detector area D2 for angles of incidence of 0° to an AOI θ5max relative to the reference plane RP.

Said third filter layer 6 features openings arranged relative to the second effective detector area D2 which allow second light L2 to propagate through the third filter layer 6 to the second effective detector area D2 if their AOI relative to the base layer is smaller than or equal to said AOI θ5max. In other words, the third filter layer 6 is structured for substantially allowing a propagation of second light L2 from the second filter layer 5 to the second effective detector area D2 for angles of incidence (relative to the reference plane RP) of 0° to θ5max for second light L2.

The third filter layer 6 is furthermore structured for substantially inhibiting a propagation of second light L2 from the second filter layer 5 to the first effective detector area D1 for angles of incidence of θ4min to θ4max relative to the reference plane RP.

The functioning of the sixth aspect of the invention is described further above in more detail.

While the invention has been described in various embodiments, it is distinctly understood that the invention is not limited thereto, but may be otherwise variously embodied and practised within the scope of the claims.

The invention claimed is:

1. Arrangement for detecting first light and second light, first light comprising one or more wavelengths of a first wavelength range only, and second light comprising one or more wavelengths of a second wavelength range only, said first and second wavelength ranges not overlapping, said arrangement comprising a first effective detector area and a second effective detector area, a first layer, a second layer, and at least a first blocking area and a second blocking area, said first layer forming a joint interface with said second layer, said joint interface being referred to as reflection interface, said first layer featuring a blocking face being different from said reflection interface, said blocking face facing said first and second blocking areas, said second layer featuring a detection face being different from said reflection interface, said detection face facing said first and second effective detector areas, said first blocking area substantially being made of a first material and said first material being substantially attenuative or substantially reflective for light of said first wavelength range and for light of said second wavelength range, a refractive index of said second layer at said reflection interface being smaller than a refractive index of said first layer at said reflection interface for any wavelength $\lambda 1$, $\lambda 1$ designating a wavelength comprised in said first wavelength range, and for any wavelength $\lambda 2$, $\lambda 2$ designating a wavelength comprised in said second wavelength range, θTR designating an angle of total reflection for a respective wavelength with θTR designating an angle of incidence relative to a reference plane, said first blocking area being structured for substantially inhibiting a propagation of light of any wavelength $\lambda 1$ and of any wavelength $\lambda 2$ from the blocking face through said first layer and said second layer to said first effective detector area for any angle of incidence θ relative to said reference plane for which applies 0°≤θ≤θ1max, with θ1max designating an angle of incidence relative to said reference plane for which applies θ1max<θTR for any wavelength $\lambda 1$ and for any wavelength $\lambda 2$;

said second blocking area being structured for substantially inhibiting a propagation of light of any wavelength $\lambda 1$ from the blocking face through said first layer and said second layer to said second effective detector area for all angles of incidence θ relative to said reference plane for which applies 0°≤θ≤θ2max, with θ2max designating an angle of incidence relative to said reference plane for which applies θ2max≥θTR for the respective wavelength $\lambda 1$, said second blocking area comprising a window area being made of a second material, said second material being substantially attenuative or substantially reflective for said first light and being substantially transmissive for said second light, said window area being structured for substantially allowing a propagation of light of any wavelength $\lambda 2$ from the blocking face through said first layer and said second layer to said second effective detector area for any angle of incidence θ relative to said reference plane for which applies 0°≤θ≤θ2min for the respective wavelength $\lambda 2$, θ2min designating an angle of incidence relative to said reference plane for which applies θ2min>0°, said second blocking area being structured for substantially inhibiting a propagation of light of any wavelength $\lambda 2$ from the blocking face through said first layer and said second layer to said second effective detector area for all angles of incidence θ relative to said reference plane for which applies θ2min≤θ≤θ2max, with θ2max designating an angle of incidence relative to said reference plane with θ2max>θTR for the respective wavelength $\lambda 2$, and with θ2min≤θ2max for the respective wavelength $\lambda 2$.

2. Arrangement according to claim 1, comprising a layer referred to as filter layer, said filter layer being located either between said blocking areas and said effective detector areas or said blocking areas being located between said filter layer and said effective detector areas, said filter layer being a low pass filter, a high pass filter and/or a band-pass filter.

3. Arrangement according to claim 2, said filter layer being substantially transmissive for light of any wavelength $\lambda 1$, said filter layer constituting substantially a band-pass filter having a central wavelength, said central wavelength depending on an angle of incidence θ relative to said reference plane, such that said central wavelength is within said second wavelength range in case of θ=(0)°, and that said central wavelength is outside said second wavelength range in case of θ>θf, with θf being a threshold angle of incidence relative to said reference plane with 0<θf<90°, θf≤θ1max and θf≤θ2max.

4. Arrangement according to claim 2, said filter layer comprising in particular either being said first layer, being comprised by said first layer, being situated between said first and second effective detector areas and said second layer, being situated between said first and second blocking areas and said first layer, or said first and second blocking areas being located between said filter layer and said first layer.

5. Arrangement according to claim 2, said filter layer being a multilayer optical component.

6. Arrangement according to claim 1, said second material comprising a semiconductor material.

7. Arrangement according to claim 1, said arrangement comprising a light source, said detection face facing said light source, and said light source being a light source for emitting said second light along an optical path from said light source towards and through said detection face, towards and through said second layer, towards and through said first layer and towards and through said blocking face.

8. Arrangement according to claim 1, said θ1max being in a range from 10° to 65°.

9. Arrangement according to claim 1, said θ2min being in a range from 2° to 15°.

10. Arrangement according to claim 1, said first wavelength range being comprised in a wavelength range from 380 nm to 750 nm and said second wavelength range being comprised in a wavelength range from 750 nm to 10 μm.

11. Arrangement for detecting first light and second light, first light comprising one or more wavelengths of a first wavelength range only, and second light comprising one or more wavelengths of a second wavelength range only, said first and second wavelength ranges not overlapping, said arrangement comprising a first effective detector area and a second effective detector area, a base layer and at least a first blocking area and a second blocking area said base layer featuring a lower face facing said first and second effective detector areas, said base layer featuring an upper face being different from said lower face, said upper face facing said first and second blocking areas, said arrangement comprising a layer being referred to as filter layer, said filter layer constituting at least one of a low pass filter, a high pass filter, or a band-pass filter, said first blocking area substantially being made of a first material and said first material being substantially attenuative or substantially reflective for light of said first wavelength range and for light of said second wavelength range, said first blocking area being structured for substantially inhibiting a propagation of light of any wavelength λ1 and of any wavelength λ2 from the upper face through said base layer to said first effective detector area for any angle of incidence θ relative to said reference plane for which applies 0°≤θ≤θ1max, with θ1max designating an angle of incidence relative to said reference plane for which applies θ1max<90° for any wavelength λ1 and θ1max≥θf for any wavelength λ2, with λ2 designating a wavelength comprised in said second wavelength range, said second blocking area being structured for substantially inhibiting a propagation of light of any wavelength λ1 from the upper face through said base layer to said second effective detector area for all angles of incidence θ relative to said reference plane for which applies 0°≤θ≤θ2max, with θ2max designating an angle of incidence relative to said reference plane, said second blocking area comprising a window area being made of a second material, said second material being substantially attenuative or substantially reflective for said first light and being substantially transmissive for said second light, said window area being structured for substantially allowing a propagation of light of any wavelength λ2 from the upper face through said base layer to said second effective detector area for any angle of incidence θ relative to said reference plane for which applies 0°≤θ≤θ2min for the respective wavelength λ2, θ2min designating an angle of incidence relative to said reference plane for which applies θ2min>0°, said second blocking area being structured for substantially inhibiting a propagation of light of any wavelength λ2 from the upper face through said base layer to said second effective detector area for all angles of incidence θ relative to said reference plane for which applies θ2min≤θ≤θ2max, with θ2max designating an angle of incidence relative to said reference plane with θ2max≥θf for the respective wavelength λ2, and with θ2min≤θ2max for the respective wavelength λ2.

12. Arrangement according to claim 11, said filter layer being substantially transmissive for light of any wavelength λ1, λ1 designating a wavelength comprised in said first wavelength range, said filter layer constituting substantially a band-pass filter having a central wavelength, said central wavelength depending on an angle of incidence θ relative to a reference plane, such that said central wavelength is within said second wavelength range in case of θ=0°, and that said central wavelength is outside said second wavelength range in case of θ>θf, with θf being a threshold angle of incidence with 0°<θf<90° and with θf designating an angle of incidence relative to said reference plane.

13. Arrangement according to claim 11, said filter layer either being said base layer, being comprised by said base layer, being situated between said first and second effective detector areas and said base layer, or said first and second blocking areas being located between said filter layer and said base layer.

14. Arrangement according to claim 11, said filter layer comprising a multilayer optical component.

15. Arrangement according to claim 11 said filter layer being a multilayer optical component comprising at least one of layers comprising silicon dioxide and layers comprising titanium dioxide.

16. Arrangement according to claim 11, said second material comprising a semiconductor material.

17. Arrangement according to claim 11, said arrangement comprising a light source, said lower face facing said light source and said light source being a light source for emitting said second light along an optical path from said light source towards and through said lower face, towards and through said base layer and towards and through said upper face.

18. Arrangement according to claim 11, said θ1max being in a range from 10° to 65°.

19. Arrangement according to claim 11, said θ2min being in a range from 2° to 15°.

20. Arrangement according to claim 11, characterized in said first wavelength range being comprised in a wavelength range from 380 nm to 750 nm and said second wavelength range being comprised in a wavelength range from 750 nm to 10 μm.

21. Arrangement according to claim 11 said arrangement comprising a first layer and a second layer, said first layer forming a joint interface with said second layer r, said second layer being substantially located between said effective detector areas and said first layer, with said joint interface being referred to as reflection interface, said first layer featuring a blocking face being different from said reflection interface, said blocking face facing said first and second blocking areas, said second layer featuring a detection face being different from said reflection interface, said detection face facing said first and second effective detector areas, said reflection interface of said second layer featuring a refractive index being smaller than a refractive index said reflection interface of said first layer for any wavelength λ1 and for any wavelength λ2, θTR designating an angle of total reflection for a respective wavelength with θTR designating an angle of incidence relative to said reference plane, with θ1max<θTR for any wavelength λ1.

22. Arrangement according to claim 21, said base layer comprising said first layer and said second layer, with said lower face being said detection face.

* * * * *